(12) United States Patent
Ueno

(10) Patent No.: US 7,535,141 B2
(45) Date of Patent: May 19, 2009

(54) MOTOR WITH THRUST BEARING HOLDER

(75) Inventor: Toshio Ueno, Nagano (JP)

(73) Assignee: Nidec Sankyo Corporation, Nagano (JP)

( * ) Notice: Subject to any disclaimer, the term of this patent is extended or adjusted under 35 U.S.C. 154(b) by 423 days.

(21) Appl. No.: 11/483,236

(22) Filed: Jul. 7, 2006

(65) Prior Publication Data

US 2007/0035190 A1   Feb. 15, 2007

(30) Foreign Application Priority Data

Jul. 8, 2005 (JP) ............................. 2005-200897
Jul. 8, 2005 (JP) ............................. 2005-200898

(51) Int. Cl.
*H02K 5/16* (2006.01)
*H02K 37/04* (2006.01)

(52) U.S. Cl. .................. 310/90; 310/49 R; 310/40 MM

(58) Field of Classification Search .................. 310/90, 310/49 R, 83, 40 MM See application file for complete search history.

(56) References Cited

U.S. PATENT DOCUMENTS 5,187,400 A * 2/1993 Kurata ...................... 310/49 R
6,208,046 B1 * 3/2001 Lee ............................ 310/49 R
2004/0135448 A1 * 7/2004 Matsushita et al. ............ 310/90
2004/0164631 A1 * 8/2004 Suzuki et al. .................. 310/90
2006/0108885 A1 * 5/2006 Nishimura .................... 310/90
2007/0035190 A1 * 2/2007 Ueno .......................... 310/90
2007/0164625 A1 * 7/2007 Kobayshi ..................... 310/90
2008/0238229 A1 * 10/2008 Iwashima et al. ............. 310/90

FOREIGN PATENT DOCUMENTS

JP 2004-135443 4/2004

* cited by examiner

*Primary Examiner*—Quyen Leung
*Assistant Examiner*—David W. Scheuermann
(74) *Attorney, Agent, or Firm*—Reed Smith LLP

(57) ABSTRACT

A motor includes a stator having a stator core, a rotor, a case, and a bearing. The motor may further include a bearing hold member provided with a through hole into which the bearing is inserted and which is disposed at one end side to the stator core and a spring member held by the case such that at least one part of the spring member overlaps the bearing hold member at one end side to the bearing hold member to urge the bearing in the through hole to the rotor shaft. A first positioning projection is formed in one of the stator core and the bearing hold member so as to protrude on a side of the other and a first fitting hole is formed in the other of the stator core and the bearing hold member so as to be fitted to the first positioning projection.

7 Claims, 7 Drawing Sheets

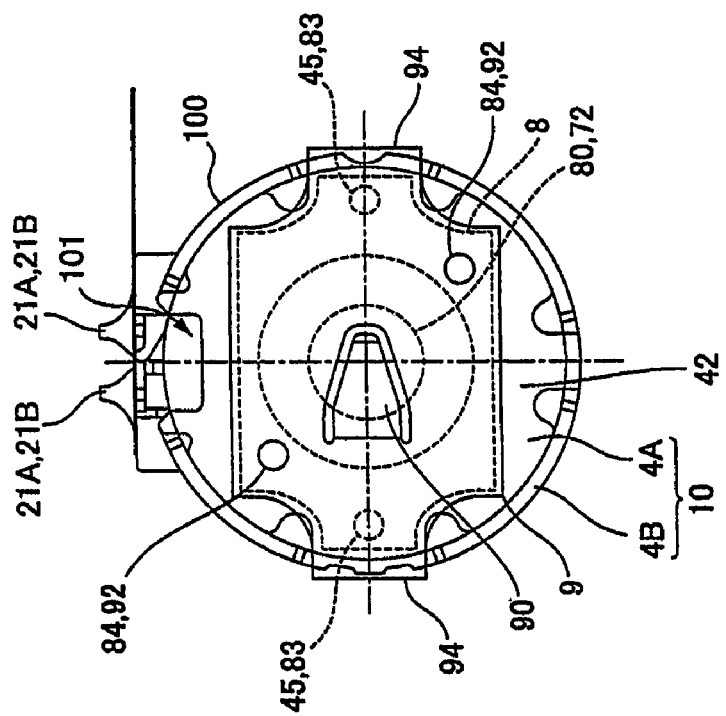
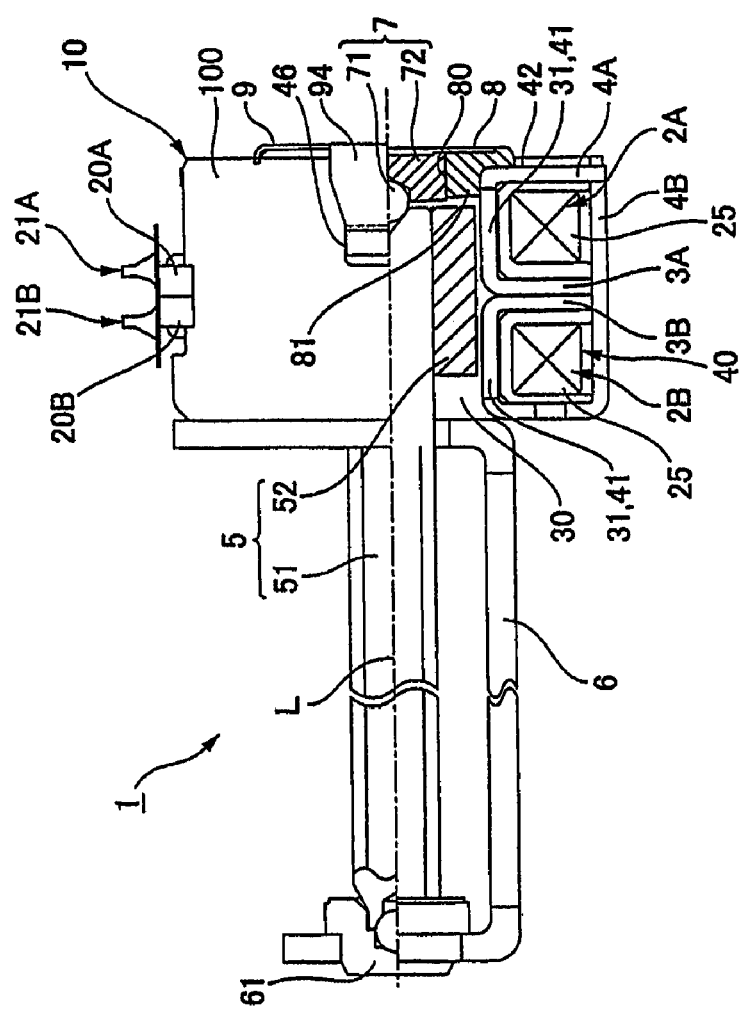
Fig. 1a
Fig. 1b

Fig. 4a
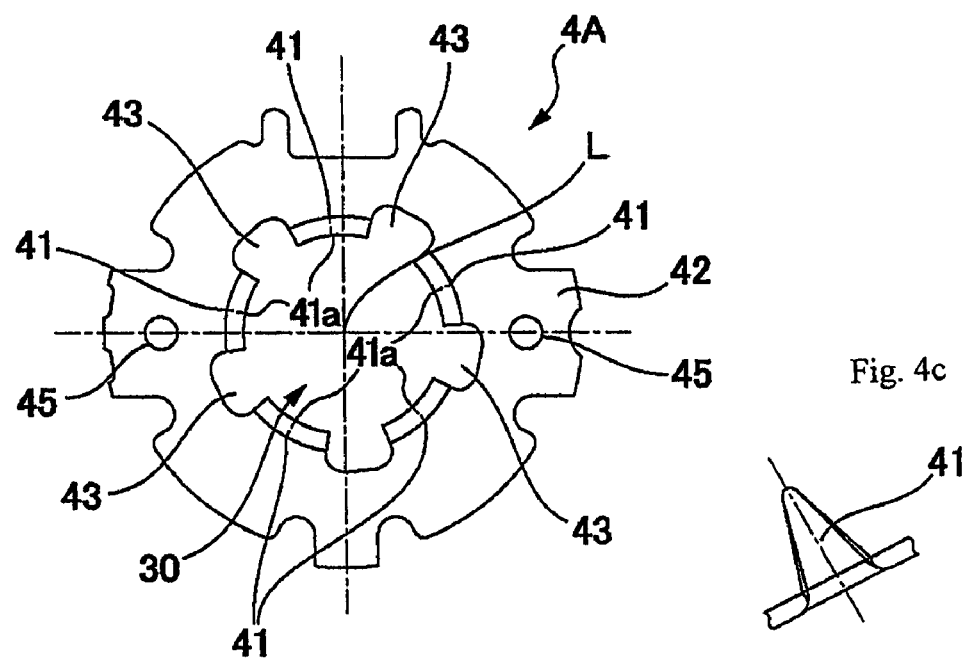
Fig. 4c
Fig. 4b
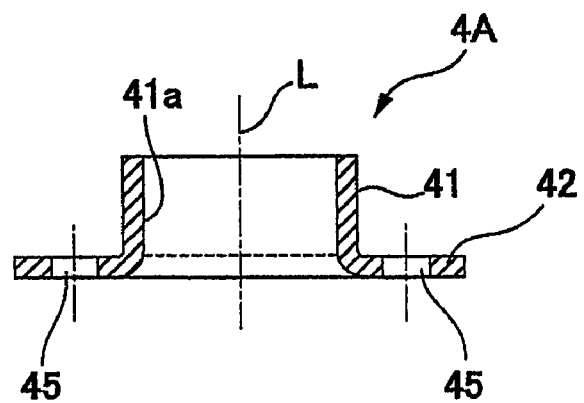

PRIOR ART

MOTOR WITH THRUST BEARING HOLDER

FIELD OF THE INVENTION

An embodiment of the present invention may relate to a motor. More specifically, an embodiment of the present invention may relate to a positioning technique of a bearing in a through hole of a bearing holding member.

BACKGROUND OF THE INVENTION

In a stepping motor which is used in a digital camera, a digital video camera, a floppy disk drive (FDD), an optical disk drive (ODD) and the like, as shown in FIGS. 7(a) and 7(b), for example, a base end portion of a rotor 102 and coils 103 are accommodated in an inner side of a case 104 which is comprised of an outer peripheral portion of a stator core 110. A bearing 105, which receives a shaft end of a rotor shaft 121 of the rotor 102, and a bearing hold member 106, which is provided with a through hole 160 into which the bearing 105 is inserted, are disposed on one end side of the case 104. Further, a spring member 107 provided with three pieces of plate spring parts 171, 172 and 173 for urging the bearing 105 in the through hole 160 to the rotor shaft 121 is disposed on further the one end side to the bearing hold member 106 (see, for example, Japanese Patent Laid-Open No. 2004-135443).

In a motor structured as described above, the bearing 105 may chatter in the through hole 160 which is caused by a clearance between the through hole 160 and the bearing 105. Therefore, the plate spring part 173 of the spring member 107 is formed wider than other plate spring parts 171 and 172 to apply imbalance to their urging forces and, as a result, the bearing 105 is elastically pressed in a predetermined direction on the inner peripheral face of the through hole 160. In this manner, the position of the bearing 105 is regulated and the center axial line of the rotor shaft 121 is held in a predetermined position.

The accuracy of the positions in a radial direction and the angular positions of the bearing hold member 106 and the spring member 107 is one of important factors to stably rotate the rotor 102. Therefore, when the positions of the bearing hold member 106 and the spring member 107 shift, the position of the bearing 105 is also shifted.

However, in the above-mentioned reference, engaging pawl parts 181 and 182 of the bearing hold member 106 are engaged with an opening part 141 that is formed in an outer peripheral face of the case 104 to determine the position in the radial direction and the angular position of the bearing hold member 106 to the case 104. Therefore, when the engaging pawl parts 181 and 182 are bent, the position of the bearing hold member 106 is shifted and thus the position of the bearing 105 is also shifted.

Further, it is conceivable that a plurality of projecting parts are formed circumferentially along the through hole 160 of the bearing hold member 106 and cut-out portions are formed at a base portion between pole teeth of a stator core 110 that are disposed on the inner peripheral face of a rotor disposing hole in a peripheral direction. The projecting parts of the bearing holding member 106 may be fitted to the cut-out portions to perform positioning of the bearing hold member 106 to the stator core 110 in the radial direction. However, in the structure described above, the degree of the positional accuracy of the bearing hold member 106 is low and thus the positional accuracy of the bearing 105 is not satisfactory.

Further, in the reference described above, engaging pawl parts 175 and 176 of the spring member 107 are engaged with opening parts 142 and 143 that are formed in an outer peripheral face of the case 104 to hold the bearing hold member 106 and to determine the relationship of the angular position between the bearing hold member 106 and the spring member 107. Therefore, when the engaging pawl parts 175 and 176 are further bent, the angular position of the spring member 107 is shifted and thus the position of the bearing 105 is also shifted.

SUMMARY OF THE INVENTION

In view of the problems described above, an embodiment of the present invention may advantageously provide a motor which is capable of maintaining the position of a bearing in a through hole with a high degree of accuracy even when the structure is utilized in which the bearing is held in the through hole of a bearing hold member.

Thus, according to an embodiment of the present invention, there may be provided a motor including a ring-shaped stator including stator cores having a plurality of pole teeth disposed in a circumferential direction in an inner peripheral face of a rotor disposing hole, a rotor, a case which accommodates the stator and a base end side of the rotor, a bearing which receives a shaft end of a rotor shaft of the rotor at one end side of the case, a bearing hold member which is provided with a through hole into which the bearing is inserted and which is disposed on the one end side to the stator such that at least one part of the bearing hold member overlaps the stator, a spring member which is held by the case such that at least one part of the spring member overlaps the bearing hold member on the one end side to the bearing hold member and which is provided with a spring part that urges the bearing in the through hole to the rotor shaft, a first positioning projection which is formed in one of the stator core and the bearing hold member so as to protrude on a side of the other of the stator core and the bearing hold member, and a first fitting hole which is formed in the other of the stator core and the bearing hold member and to which the first positioning projection is fitted.

According to the structure described above, the angular position between the stator core and the bearing hold member is fixed by the first positioning projection and the first fitting hole. Therefore, since the angular position of the bearing hold member does not shift, the center axial line of the bearing does not shift under the state where the bearing is elastically pressed by the spring member in the through hole of the bearing hold member. Accordingly, the center axial line of the rotor shaft can be maintained at a specified position.

In accordance with an embodiment, the bearing hold member is provided with a ring-shaped projection for positioning. The ring-shaped projection is protruded from a circumference of the through hole to the stator and is inscribed on an inner peripheral face of the pole teeth.

According to the structure described above, the bearing hold member is surely positioned in the radial direction under the state that the inner peripheral faces of the pole teeth of the stator are served as a reference, and this state means that the position in the radial direction of the bearing hold member for determining the motor axial line is directly determined to the rotor disposing hole. Therefore, in accordance with an embodiment, since the position in the radial direction of the bearing hold member is directly determined to the rotor disposing hole, a high degree of positional accuracy of the bearing hold member can be attained in comparison with a conventional case where the position in the radial direction of the bearing hold member is determined by the protruded parts that are fitted to the cut-out portions provided at the base portion between the pole teeth of a stator core. Accordingly, in the state where the bearing is fitted to the through hole of the bearing hold member, a high degree of positional accuracy in the radial direction of the bearing can be obtained.

In accordance with an embodiment, a second positioning projection is formed in one of the spring member and the bearing hold member so as to protrude to the other member, and a second fitting hole is formed in the other member into which the second positioning projection is fitted.

According to the structure described above, the angular position between the spring member and the bearing hold member is fixed by the second positioning projection and the second fitting hole. Therefore, since relative relationship of the angular position between the spring member and the bearing hold member does not shift, the direction in which the bearing is pressed does not shift in the state where the bearing is elastically pressed by the spring member in the through hole of the bearing hold member. Accordingly, the center axial line of the rotor shaft can be maintained at a specified position. In addition, the stator core and the bearing hold member are positioned each other and the bearing hold member and the spring member are positioned each other, and thus the stator core and the spring member are positioned through the bearing hold member. Therefore, the positioning of three members, i.e., the stator core, the bearing hold member and the spring member, can be easily and accurately performed.

In accordance with an embodiment, the first positioning projection and the first fitting hole are respectively formed at two or more positions. According to the structure described above, the angular position of the bearing hold member to the stator can be surely determined by the first positioning projection and the first fitting hole.

In accordance with an embodiment, the bearing hold member is made of resin and the first positioning projection is formed in the bearing hold member. When the bearing hold member is made of resin, a clearance between the through hole and the bearing is liable to become large and thus the bearing may be easily shifted. However, according to an embodiment of the present invention, since such shift can be prevented, even when the bearing hold member is made of resin, the position of the bearing can be determined with a high degree of accuracy and thus the center axial line of the rotor shaft can be maintained at a specified position. Further, when the bearing hold member is made of resin, the positioning projection and the ring-shaped projection can be easily and accurately formed at the time of molding, and thus the production efficiency and the structure are advantageous in comparison with a case where the positioning projection is formed in the stator and the spring member.

In accordance with an embodiment, the second positioning projection and the second fitting hole are respectively formed at two or more positions. According to the structure described above, the relative relationship of the angular position between the spring member and the bearing hold member can be surely determined by the second positioning projection and the second fitting hole.

In accordance with an embodiment, the bearing hold member is made of resin and the second positioning projection is formed in the bearing hold member. When the bearing hold member is made of resin, a clearance between the through hole and the bearing is liable to become large and thus the bearing may be easily shifted. However, according to an embodiment of the present invention, since such shift can be prevented, even when the bearing hold member is made of resin, the position of the bearing can be determined with a high degree of accuracy and thus the center axial line of the rotor shaft can be maintained at a specified position. Further, when the bearing hold member is made of resin, the positioning projection and the ring-shaped projection can be easily and accurately formed at the time of molding, and thus the production efficiency and the structure are advantageous in comparison with a case where the positioning projection is formed in the stator and the spring member.

In accordance with an embodiment, the case is structured by using an outer peripheral portion of the stator core which is located on an outer side of a coil that is wound around the stator core.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

FIG. 1($a$) is a half cross-sectional view showing a stepping motor in accordance with an embodiment of the present invention and FIG. 1($b$) is its bottom view.

FIG. 4($a$) is a plan view showing an outer stator core of the stepping motor shown in FIG. 1, FIG. 4($b$) is its longitudinal cross-sectional view, and FIG. 4($c$) is an explanatory view showing one of pole teeth viewed from the axial line of the motor.

DETAILED DESCRIPTION OF THE PREFERRED EMBODIMENTS

A motor in accordance with an embodiment of the present invention will be described below with reference to the accompanying drawings.

Figure 2:
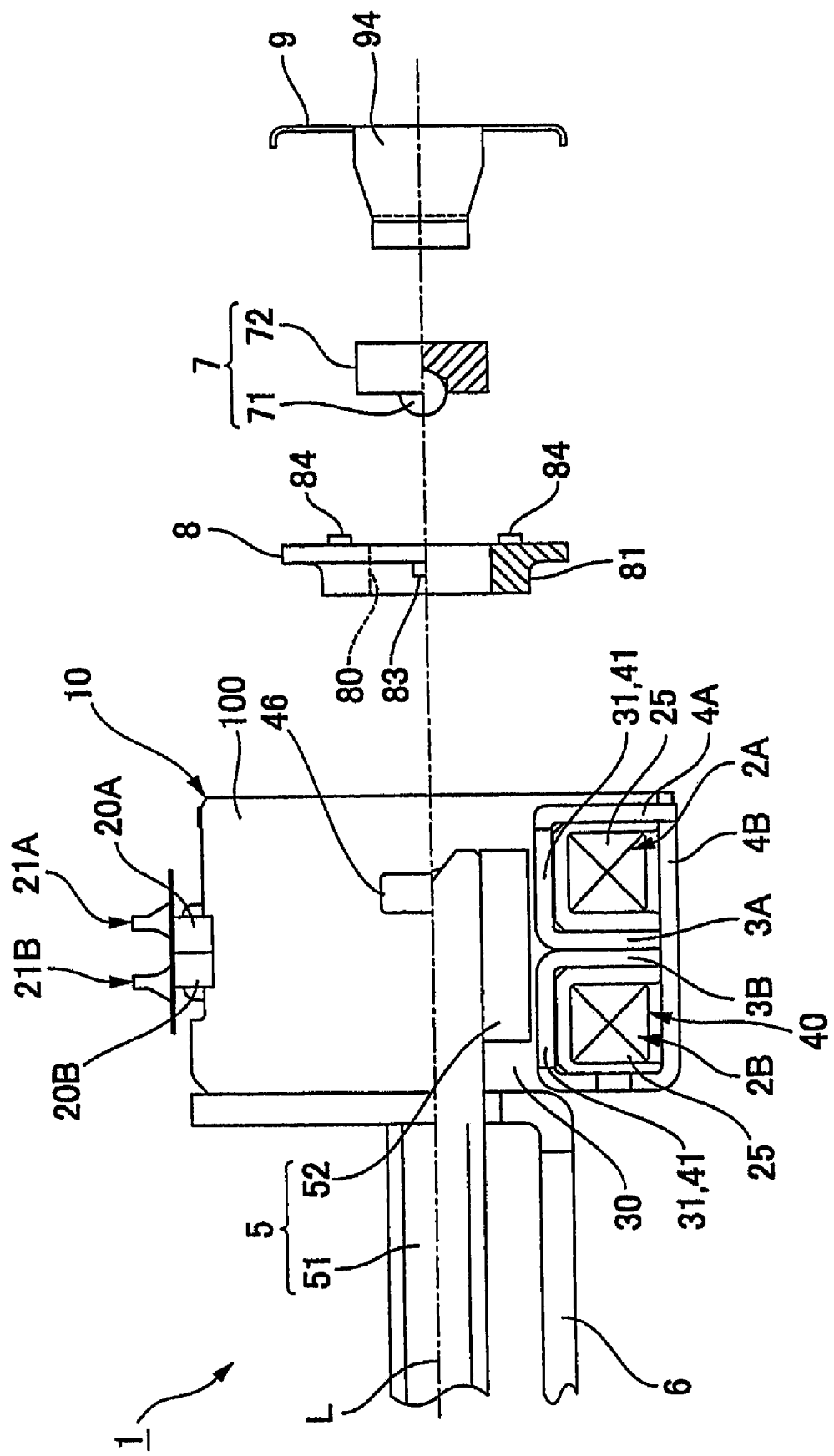
FIG. 2 is an explanatory exploded view showing one end side (base end side) of a stepping motor in accordance with an embodiment.

FIG. 1($a$) is a half cross-sectional view showing a stepping motor in accordance with an embodiment of the present invention and FIG. 1($b$) is its bottom view. FIG. 2 is an explanatory exploded view showing one end side (base end side) of a stepping motor in accordance with an embodiment.

In FIGS. 1($a$) and 1($b$) and FIG. 2, a motor 1 in accordance with an embodiment is a small-sized stepping motor which is used in a digital camera, a digital video camera, a floppy disk drive (FDD), an optical disk drive (ODD) or the like. In the stator 40 of the motor, a first bobbin 2A and a second bobbin 2B each of which is formed in a ring shape and around which a coil 25 is wound are disposed so as to be superposed in a direction of the motor axial line "L". Each of pluralities of the pole teeth 31, 41 of inner stator cores 3A, 3B and outer stator cores 4A, 4B are arranged in a peripheral direction on the inner peripheral face of the first bobbin 2A and the second bobbin 2B. In this manner, the ring-shaped stator 40 provided with a rotor disposing hole 30 is structured and the base end side of the rotor 5 is disposed on the inner side of the rotor disposing hole 30 in a coaxial manner. The rotor 5 is provided with a rotor magnet 52 on the base end side of a rotor shaft 51 and the rotor magnet 52 faces the pole teeth 31 and 41 of the stator through a specified gap space on the inner side of rotor disposing hole 30.

In this embodiment, a cylindrical case 10 is structured by outer peripheral portions of the outer stator cores 4A, 4B. The coils 25, the inner stator cores 3A, 3B and outer stator cores 4A, 4B, which structure the stator 40, and the base end side of the rotor 5 are disposed in the inside of the case 10.

A plate 6 is fixed to the end face of the outer stator core 4B which structures the case 10. A rotor shaft 51 of the rotor 5 is supported by a thrust bearing 61 that is held in a bent portion on the tip end side of the plate 6.

Further, the rotor shaft 51 is also supported by a bearing 7 which is disposed on one end side (the first bobbin 2A side) in the direction of the motor axial line "L". The bearing 7 is provided with a steel ball 71 and a main barrel part 72 which is made of resin and rotatably retains the steel ball 71.

In accordance with an embodiment, a bearing hold member 8 which is formed of resin in a plate-like shape is disposed on one end side of the stator 40 such that at least a part of the bearing hold member 8 overlaps with the stator 40. The bearing 7 is inserted into a through hole 80 of the bearing hold member 8.

A spring member 9 which is formed of a sheet metal is disposed on the one end side of the bearing hold member 8 such that that at least one part of the spring member 9 overlaps with the bearing hold member 8. An end portion of the bearing 7 disposed in the through hole 80 is urged to the rotor shaft 51 by a flat spring part 90 which is formed by cutting and bent from the spring member 9. In accordance with an embodiment, the flat spring part 90 abuts with the bearing 7 at a position which shifts from the center of the main barrel part 72 of the bearing 7.

The spring member 9 is held by the case 10 with an engaging mechanism described below so as to sandwich and retain the bearing hold member 8 in a state where the bearing 7 is inserted into the through hole 80.

Terminal parts 20A and 20B are structured on an outer side in the radial direction of the first bobbin 2A and the second bobbin 2B such that the terminal parts 20A and 20B are protruded from an opening part 101 that is formed in an outer peripheral face 100 of the case 10. End portions of winding are connected with terminal pins 21A and 21B of the terminal parts 20A and 20B.

Figure 3:
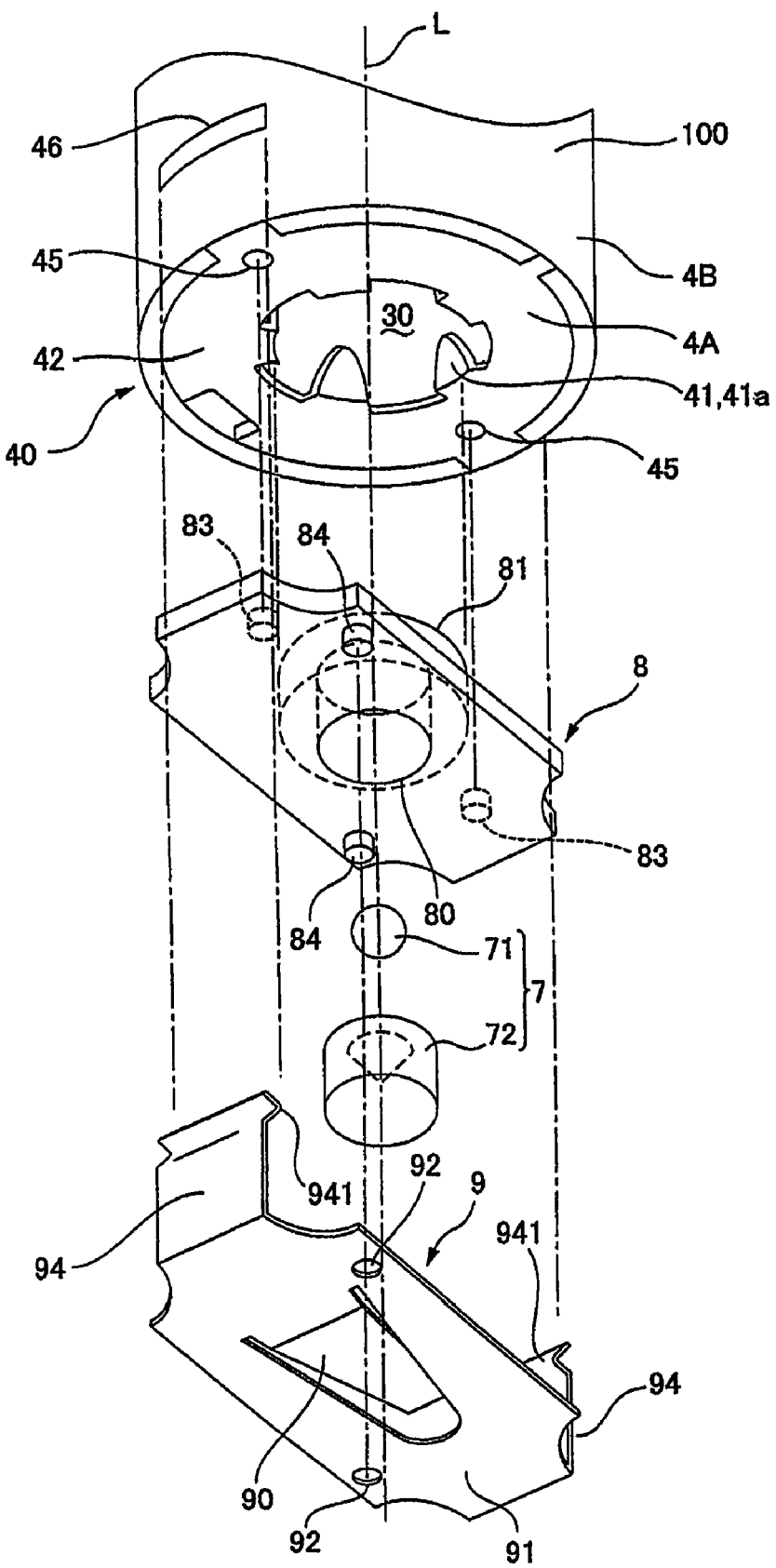
FIG. 3 is an exploded perspective view showing an essential portion of the stepping motor 1 shown in FIG. 1.
Figure 5A:
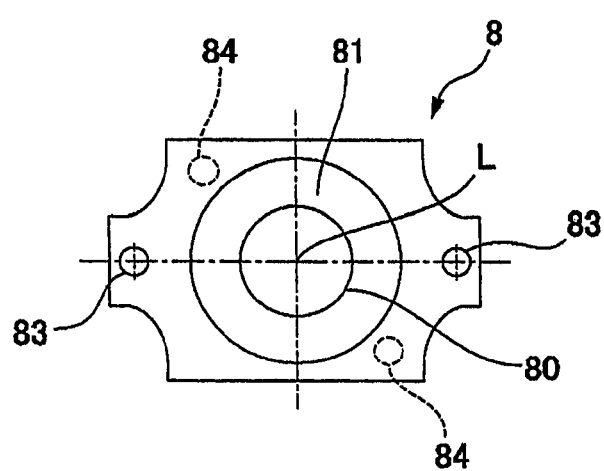
FIG. 5($a$) is a plan view showing a bearing hold member of the stepping motor shown in FIG. 1, FIG. 5($b$) is its front view partly shown in cross section, and FIG. 5($c$) is its side view.
Figure 5C:
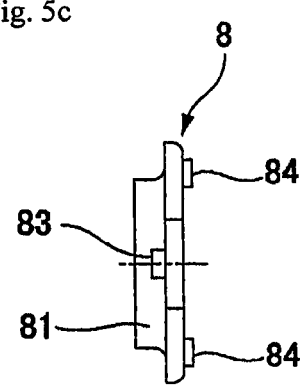
Figure 5B:
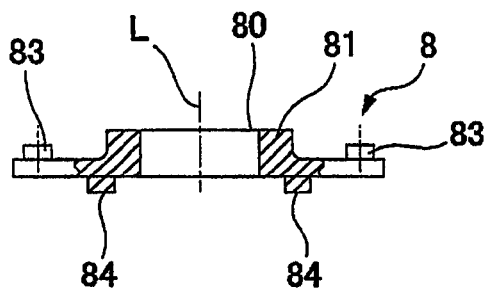
Figure 6A:
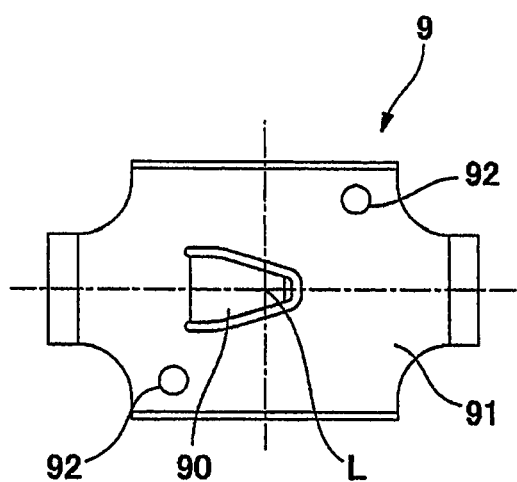
FIG. 6($a$) is a plan view showing a spring member of the stepping motor shown in FIG. 1, FIG. 6($b$) is its cross sectional front view, FIG. 6($c$) is its side view, and FIG. 6($d$) is an explanatory cross-sectional view showing a modified example of a spring part of the spring member.
Figure 6C:
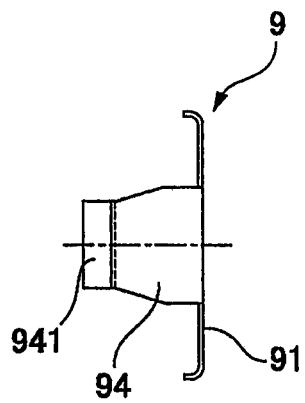
Figure 6B:
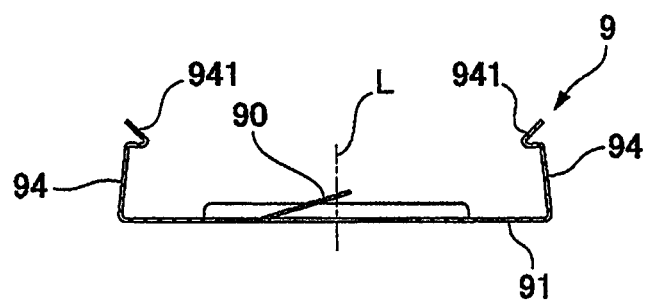
Figure 6D:
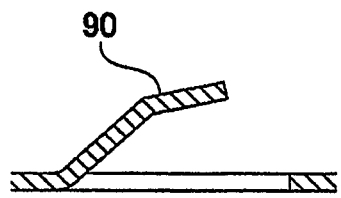
Figure 7B:
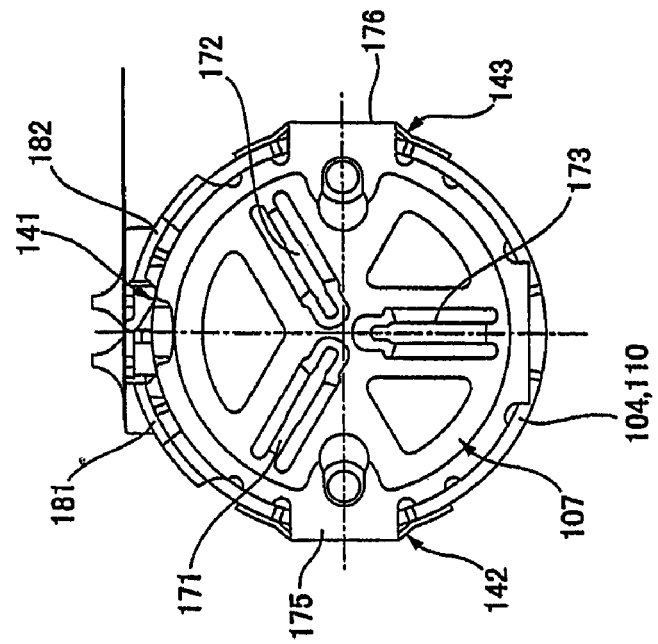
FIG. 7($a$) is a half cross-sectional view showing a conventional stepping motor and FIG. 7($b$) is its bottom view.
Figure 7A:
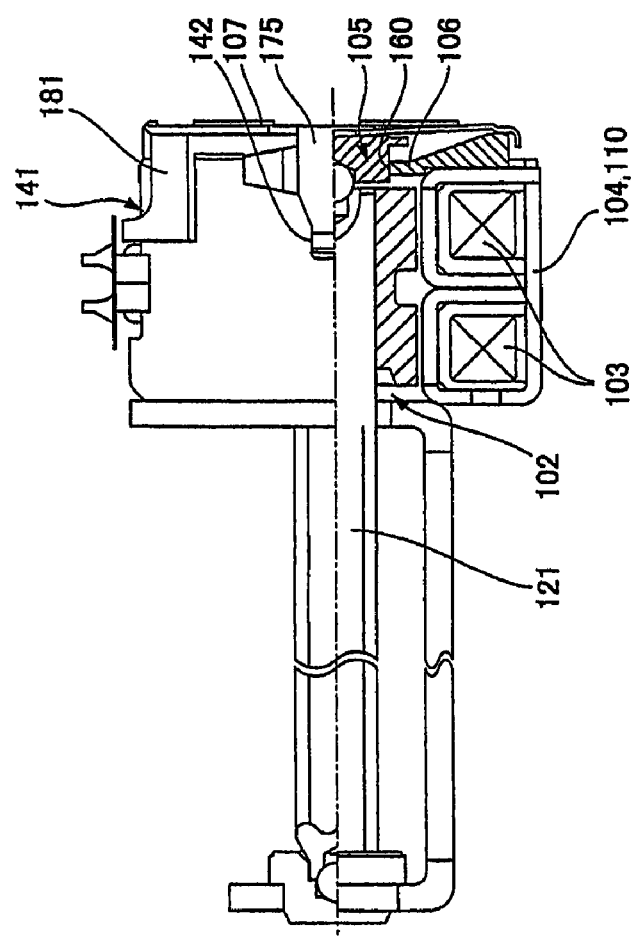

FIG. 3 is an exploded perspective view showing an essential portion of the stepping motor 1 shown in FIGS. 1(a) and 1(b). FIG. 4(a) is a plan view showing the outer stator core 4A of the motor 1 shown in FIGS. 1(a) and 1(b). FIG. 4(b) is its longitudinal cross-sectional view, and FIG. 4(c) is an explanatory view showing one of pole teeth 41 viewed from the axial line "L" of the motor. FIG. 5(a) is a plan view showing the bearing hold member 8 of the motor 1 shown in FIGS. 1(a) and 1(b), FIG. 5(b) is its front view partly shown in cross section, and FIG. 5(c) is its side view. FIG. 6(a) is a plan view showing the spring member 9 of the motor 1 shown in FIGS. 1(a) and 1(b), FIG. 6(b) is its cross sectional front view, FIG. 6(c) is its side view, and FIG. 6(d) is an explanatory cross-sectional view showing a modified example of a spring part 90 of the spring member.

In accordance with an embodiment, the following structure is utilized in order to fix the bearing hold member 8 and the spring member 9 to the outer stator core 4A (case 10) in this order.

First, as shown in FIG. 3, FIGS. 4(a) through 4(c), the outer stator core 4A is provided with a roughly circular ring shaped bottom plate portion 42 located on one end side of the case 10 and five pole teeth 41 raised from the inner circumferential edge of the bottom plate portion 42. These pole teeth 41 are formed in equal angular intervals and the inner peripheral faces 41a of the pole teeth 41 are formed in a circular arc shape so as to be located on a concentric circle in which the motor axis line "L" is at its center as shown in FIG. 4(a). Cutout parts 43 are respectively formed between the respective pole teeth 41 in the inner circumferential edge of the bottom plate portion 42. Pole teeth 31 of the inner stator core 3A shown in FIG. 2 are extended to the cutout parts 43. In this manner, the pole teeth 31 of the inner stator core 3A and the pole teeth 41 of the outer stator core 4A are alternately disposed in the circumferential direction.

In accordance with an embodiment, two holes 45 (first fitting hole) for positioning the bearing hold member 8 are formed in the bottom plate portion 42 and the holes 45 are formed at symmetrical positions about the motor axis line "L".

As shown in FIG. 3, FIGS. 5(a) through 5(c), the bearing hold member 8 is a resin molded product and its planar shape is a roughly rectangular shape whose four corners are cut out in a circular arc shape. A circular through hole 80 into which the bearing 7 is inserted is formed at the center of the bearing hold member 8.

A ring-shaped projection 81 which is protruded so as to surround an aperture edge of the through hole 80 is formed on a face of the bearing hold member 8 that faces the bottom plate portion 42 of the outer stator core 4A. In accordance with an embodiment, the outer diameter of the ring-shaped projection 81 is set to be a slightly smaller dimension than the diameter of an inscribed circle of the inner peripheral faces 41a of the pole teeth 41 of the outer stator core 4A. The protruded dimension of the ring-shaped projection 81 is set to be sufficiently shorter than the dimension of the pole teeth 41. Accordingly, when the motor 1 is assembled, the ring-shaped projection 81 is fitted to the inside of the pole teeth 41 of the outer stator core 4A and, as a result, the bearing hold member 8 is radially positioned by the outer stator core 4A (case 10). In this state, since the protruded dimension of the ring-shaped projection 81 is sufficiently shorter than the dimension of the pole teeth 41, the ring-shaped projection 81 does not abut with the rotor 5.

Two protruded parts 83 (first positioning projection) are formed on a face of the bearing hold member 8 that faces the outer stator core 4A so as to be protruded on a side facing the outer stator core 4A at both side positions across the through hole 80 to be fitted to the two positioning holes 45 of the outer stator core 4A. Therefore, when the motor 1 is assembled, two protruded parts 83 of the bearing hold member 8 are fitted to two positioning holes 45 of the outer stator core 4A to determine the angular position of the bearing hold member 80 to the stator 40.

Further, two second protruded parts 84 (second positioning projection) are formed on a face of the bearing hold member 8 that faces the spring member 9 at diagonal positions across the through hole 80.

As shown in FIG. 3, FIGS. 6(a) through 6(c), similarly to the bearing hold member 8, the spring member 9 is provided with a flat end plate part 91 whose planar shape is a roughly rectangular shape and whose four corners are cut out in a circular arc shape. A flat spring part 90 is linearly cut and raised from a center portion of the flat end plate part 91 toward the side where the bearing hold member 8 is located. The tip end portion of the flat spring part 90 is extended to the position which is shifted from the center of the through hole 80 to abut with the main barrel part 72 of the bearing 7 at the position which is shifted from the center of the main barrel part 72. The shape of the flat spring part 90 may be appropriately modified and, for example, as shown in FIG. 6(d), the flat spring part 90 may be bent at a midway position to adjust its urging force or its urging direction.

Further, two holes 92 (second fitting hole) which are respectively fitted to two protruded parts 84 of the bearing hold member 8 are formed in the spring member 9 at diagonal positions across the flat spring part 90 of the flat end plate part 91. Therefore, when the motor 1 is assembled, two protruded parts 84 of the bearing hold member 8 are respectively fitted to two positioning holes 92 of the spring member 9 and thus the angular position of the spring member 9 is determined to the bearing hold member 80. As a result, the flat spring part 90 urges the bearing 7 in the through hole 80 in a predetermined direction and the urging direction of the flat spring part 90 is set in the predetermined direction.

Further, long side portions of the flat end plate part 91 of the spring member 9 are bent along its edge on the side of the bearing hold member 8 with a small width to increase its strength such that the flat end plate part 91 does not warp.

A pair of engaging pawl parts 94 which are extended along the outer peripheral face 100 of the case 10 (outer stator core 4B) is formed on short side portions of the spring member 9. The engaging pawl parts 94 are respectively provided with a bent portion 941 that is bent on an inner side at its end. On the other hand, a rectangular hole 46 as a portion to be engaged is formed in the outer peripheral face 100 of the case 10 at a position corresponding to the bent portion 941. Therefore, when the flat end plate part 91 of the spring member 9 is overlapped on the case 10 in the state where the bearing hold member 8 is sandwiched between the flat end plate part 91 and the case 10, the engaging pawl parts 94 are respectively extended along the outer peripheral face 100 of the case 10 such that the bent portions 941 are engaged with the rectangular holes 46. In this state, since the engaging pawl parts 94 elastically engage with the rectangular holes 46, the bearing hold member 8 and the spring member 9 are held by the case 10. In this case, since the flat end plate part 91 of the spring member 9 is formed in a shape in which four corners of a rectangle are cut out in a circular arc shape, the engaging pawl parts 94 are easily bent. Therefore, the bent portions 941 of the spring member 9 can be easily engaged with the rectangular holes 46 formed in the outer peripheral face 100 of the case 10.

As described above, in accordance with this embodiment, when the motor 1 is assembled, the bearing hold member 8 is radially positioned to the outer stator core 4A (stator 40) by means of that the ring-shaped projection 81 of the bearing hold member 8 is fitted on the inner side of the pole teeth 41 of the outer stator core 4A. Therefore, the bearing hold member 8 is radially positioned with the inner peripheral face 41a of the pole teeth 41 of the outer stator core 4A as a reference. In this state, the position in the radial direction of the bearing hold member 8 directly determines the motor axial line "L" to the rotor disposing hole 30. Therefore, in this embodiment, since the position in the radial direction of the bearing hold member 8 directly determines the motor axial line "L" to the rotor disposing hole 30, a high degree of positional accuracy of the bearing hold member 8 can be attained in comparison with a case where the position in the radial direction of the bearing hold member is determined by the protruded parts fitted to the cut-out portions provided at the base portion between the pole teeth of a stator core. Accordingly, in the state where the bearing 7 is fitted to the through hole 80 of the bearing hold member 8, a high degree of positional accuracy in the radial direction of the bearing 7 can be obtained.

Further, since two protruded parts 83 of the bearing hold member 8 are respectively fitted to two positioning holes 45 of the outer stator core 4A, the angular position of the bearing hold member 80 to the stator 40 is determined. Therefore, since the angular position of the bearing hold member 8 to the stator 40 does not shift, the center axial line of the bearing 7 does not shift under the state that the bearing 7 is elastically pushed by the spring member 9 within the through hole 80 of the bearing hold member 8.

Further, the angular position of the spring member 9 to the bearing hold member 80 is determined by means of that two protruded parts 84 of the bearing hold member 8 are respectively fitted to two positioning holes 92 of the spring member 9. Therefore, since relative relationship of the angular position between the spring member 9 and the bearing hold member 8 does not shift, the direction in which the bearing 7 is pressed does not shift in the state where the bearing 7 is elastically pressed by the spring member 9 within the through hole 80 of the bearing hold member 8.

Accordingly, in the motor 1 in accordance with this embodiment, the center axial line of the rotor 5 (motor axial line "L") can be aligned with the center axial line of the bearing 7 with a high degree of accuracy and the center axial line of the rotor shaft 51 (motor axial line "L") can be surely maintained at a specified position. As a result, the rotor 5 can be rotated in a stable manner and, for example, even when the rotor shaft 51 of the rotor 5 is structured as a lead screw, a high degree of feeding accuracy of a screw can be attained.

In addition, in accordance with this embodiment, the stator core 4A and the bearing hold member 8 are positioned each other, and the bearing hold member 8 and the spring member 9 are positioned each other. Therefore, the stator core 4A and the spring member 9 are positioned each other through the bearing hold member 8. Further, four protruded parts 83, 84 are formed in the bearing hold member 8 that is a resin molded product, and these protruded parts 83, 84 can be formed with a high degree of accuracy by means of that the bearing hold member 8 is molded in a die. Therefore, three members, i.e., the outer stator core 4A (stator 40), the bearing hold member 8 and the spring member 9 can be easily and accurately positioned. Accordingly, since the rotational center axial line of the rotor 5 and the center axial line of the bearing 7 can be aligned with a high degree of accuracy, the center axial line of the rotor shaft 51 can be surely maintained at a predetermined position.

The present invention may be applied to a motor other than a stepping motor. Further, the number of the flat spring part 90 that is provided for urging the bearing 7 to the end face of the motor shaft may be two or more. In addition, in the embodiment described above, the positioning projections (protruded parts 83, 84) are formed in the bearing hold member, but the positioning projections may be formed in the spring member 9 and the outer stator core 4A.

Further, in the embodiment described above, the case 10 is structured by the outer peripheral portion of the outer stator cores 4A and 4B, but the case 10 may be formed separately from the outer stator cores 4A and 4B. In this case, one part of the stator 40 (outer peripheral portion) is structured with a separate case 10 and the outer stator core 4B may be provided with, similarly to the outer stator core 4A, a bottom plate portion in a circular ring shape and pole teeth formed bent from the inner circumferential edge of the bottom plate portion. In other words, the outer stator core 4B may be formed without the outer peripheral face 100.

In addition, the outer stator cores 4A and 4B in the above-mentioned embodiment may be covered with another cylindrical case. This cylindrical case may not be required to be a member which structures the stator 40.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A motor comprising:
   a ring-shaped stator including stator cores having a plurality of pole teeth disposed in a circumferential direction in an inner peripheral face of a rotor disposing hole;
   a rotor;
   a case which accommodates the stator and a base end side of the rotor;
   a bearing which receives a shaft end of a rotor shaft of the rotor at one end side of the case;
   a bearing hold member which is provided with a through hole into which the bearing is inserted and which is disposed at the one end side to the stator such that at least one part of the bearing hold member overlaps the stator;
   a spring member which is held by the case such that at least one part of the spring member overlaps the bearing hold member at the one end side to the bearing hold member, and which is provided with a spring part that urges the bearing in the through hole to the rotor shaft;
   a first positioning projection which is formed in one of the stator core and the bearing hold member so as to protrude on a side of the other of the stator core and the bearing hold member; and
   a first fitting hole which is formed in the other of the stator core and the bearing hold member, and to which the first positioning projection is fitted;
   wherein the bearing hold member is provided with a ring-shaped projection for positioning which is protruded from a circumference of the through hole toward the stator, and the ring-shaped projection is inscribed on inner peripheral faces of the pole teeth so that the bearing hold member is positioned in a radial direction by the inner peripheral faces of the pole teeth.

2. The motor according to claim 1, further comprising
   a second positioning projection which is formed in one of the spring member and the bearing hold member so as to protrude to the other of the spring member and the bearing hold member; and
   a second fitting hole which is formed in the other of the spring member and the bearing hold member and into which the second positioning projection is fitted.

3. The motor according to claim 1, wherein the first positioning projection and the first fitting hole are respectively formed at two or more positions.

4. The motor according to claim 1, wherein the bearing hold member is made of resin and the first positioning projection is formed in the bearing hold member.

5. The motor according to claim 2, wherein the second positioning projection and the second fitting hole are respectively formed at two or more positions.

6. The motor according to claim 2, wherein the bearing hold member is made of resin and the second positioning projection is formed in the bearing hold member.

7. The motor according to claim 1, wherein the case is structured with a portion of the stator core which is located on an outer peripheral side of a coil that is wound around the stator core.

* * * * *